(12) United States Patent
Van Riel et al.

(10) Patent No.: US 7,913,116 B2
(45) Date of Patent: Mar. 22, 2011

(54) SYSTEMS AND METHODS FOR INCREMENTAL RESTORE

(75) Inventors: Henri H. Van Riel, Nashua, NH (US); Herman Robert Kenna, Harvard, MA (US)

(73) Assignee: Red Hat, Inc., Raleigh, NC (US)

( * ) Notice: Subject to any disclaimer, the term of this patent is extended or adjusted under 35 U.S.C. 154(b) by 330 days.

(21) Appl. No.: 12/038,307

(22) Filed: Feb. 27, 2008

(65) Prior Publication Data

US 2009/0217085 A1    Aug. 27, 2009

(51) Int. Cl.
  G06F 11/00   (2006.01)
(52) U.S. Cl. ............... 714/19; 714/1; 714/52; 709/202; 709/203
(58) Field of Classification Search .................. 714/1, 4, 714/6, 52; 709/202, 203; 707/200, 202
See application file for complete search history.

(56) References Cited

U.S. PATENT DOCUMENTS

| | | | | |
|---|---|---|---|---|
| 5,608,865 A * | 3/1997 | Midgely et al. | ................... | 714/1 |
| 6,131,148 A * | 10/2000 | West et al. | .................... | 711/162 |
| 6,401,098 B1 * | 6/2002 | Moulin | ................. | 1/1 |
| 6,446,085 B1 * | 9/2002 | Gusler et al. | ........................... | 1/1 |
| 6,546,474 B1 * | 4/2003 | Weigelt | ........................ | 711/162 |
| 6,647,400 B1 * | 11/2003 | Moran | ................... | 1/1 |
| 6,948,038 B2 * | 9/2005 | Berkowitz et al. | ............. | 711/162 |
| 6,985,901 B1 * | 1/2006 | Sachse et al. | ........................ | 1/1 |
| 7,032,126 B2 * | 4/2006 | Zalewski et al. | ................... | 714/7 |
| 7,082,456 B2 * | 7/2006 | Mani-Meitav et al. | ........ | 709/203 |
| 7,155,465 B2 * | 12/2006 | Lee et al. | ............................... | 1/1 |
| 7,185,048 B2 * | 2/2007 | Arakawa et al. | .............. | 709/202 |
| 2002/0083037 A1 * | 6/2002 | Lewis et al. | ........................ | 707/1 |
| 2002/0083120 A1 * | 6/2002 | Soltis | ............................ | 709/200 |
| 2002/0144069 A1 * | 10/2002 | Arakawa et al. | .............. | 711/162 |
| 2003/0149736 A1 * | 8/2003 | Berkowitz et al. | ............ | 709/213 |
| 2004/0088331 A1 * | 5/2004 | Therrien et al. | ............. | 707/200 |
| 2004/0088382 A1 * | 5/2004 | Therrien et al. | ............. | 709/219 |
| 2004/0093361 A1 * | 5/2004 | Therrien et al. | ............. | 707/204 |
| 2004/0098415 A1 * | 5/2004 | Bone et al. | ..................... | 707/200 |
| 2005/0028025 A1 * | 2/2005 | Zalewski et al. | ................... | 714/6 |
| 2005/0182910 A1 * | 8/2005 | Stager et al. | ................... | 711/162 |
| 2006/0106818 A1 * | 5/2006 | Reed et al. | ..................... | 707/100 |
| 2007/0124341 A1 * | 5/2007 | Lango et al. | ................... | 707/202 |

FOREIGN PATENT DOCUMENTS

WO   WO 9912098 A1 *   3/1999

OTHER PUBLICATIONS

Kaczmarski et al., "Beyond backup toward storage management" 2003, pp. 1-16.*

* cited by examiner

*Primary Examiner* — Robert Beausoliel
*Assistant Examiner* — Jeison C Arcos
(74) *Attorney, Agent, or Firm* — MH2 Technology Law Group LLP

(57) ABSTRACT

An embodiment relates generally to a method of restoring data in storage systems. The method includes providing for a current snapshot of a primary storage system at a secondary storage system and mounting an empty volume in the primary storage system. The method also includes receiving a request for a selected block of data in the primary storage system and retrieving a restore block from the secondary storage system, where the restore block encompasses the selected block of data. The method further includes writing the restore block to the empty volume in the primary storage system as an incremental restore process.

19 Claims, 4 Drawing Sheets

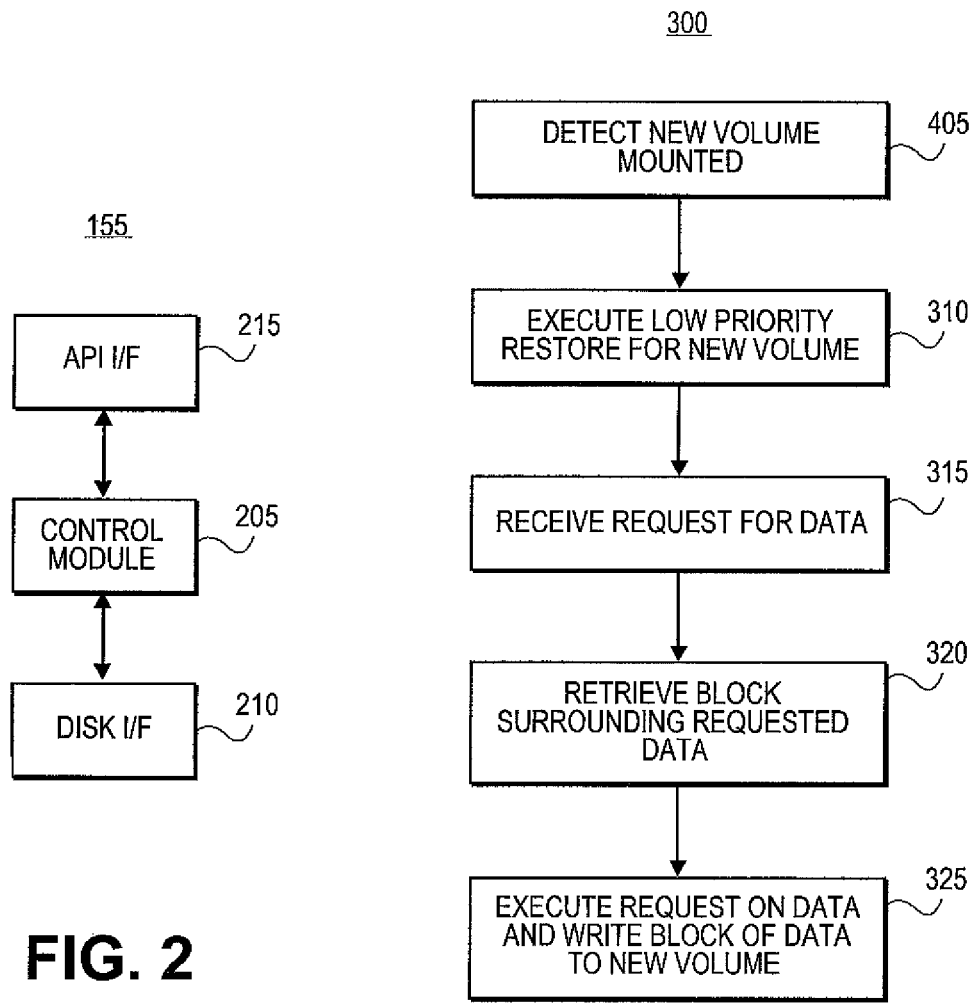

SYSTEMS AND METHODS FOR INCREMENTAL RESTORE

FIELD

This invention relates generally to the restoration of data to a storage device, more particularly, to systems and methods for an incremental restore of the storage device.

DESCRIPTION OF THE RELATED ART

Computer networks have been remarkably successful at processing, communicating, and storing of vast amounts of data. As companies today become more accustomed to storing important company information on their data network, the value of these networks and the data they store continues to grow. In fact, many companies now identify the data stored on their computer network as their most valuable corporate asset.

Advances in disk storage have created the capability of managing huge amounts of data and large numbers of files within a single file system. The conventional technique for backing up files involves running a backup application which can run in either full mode or in incremental mode. A full backup (that is, a backup running in full mode, also known as a base backup) backs up the entire file system to a single data sink by reading the entire name tree and by transferring copies of each file. An incremental backup transfers new copies of the file for any file which has been created or changed and an incremental backup also makes note of files which have been deleted. Backup copies of deleted files are eventually deleted according to some policy mechanism (for example, retain the backup copy for one month).

The conventional backup and restoration of computers of the enterprise network has been problematic. The backup operation of data is cumbersome, requires bandwidth, and effort. Moreover, the restore operation from the secondary storage site to the primary site is also time consuming and difficult. For example, if a portion of the data is lost, it is often difficult to restore just the data that was lost, and often the system administrator is forced to decide whether it is worth the cost of retrieving the lost portion of the data. Another example is since typical back up sites have a lower bandwidth connection to the primary site, the restore operation requires additional time to transfer the data to the primary site, which slows the overall performance of the storage system.

Another disadvantage or limitation is the restore operations typically are sequential in nature. More particularly, the restore operation typically starts at the beginning of the secondary disk and restores information block by block to the primary site. However, data that is required or needed is typically accessed more frequently than less important data. It would be advantageous if these active blocks were prioritized for restoration as opposed to waiting for the entire disk to be restored before accessing these same blocks.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 2 illustrates an exemplary block diagram of a backup restore module in accordance with various embodiments;

FIG. 3 depicts an exemplary flow diagram in accordance with various embodiments;

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of storage systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to systems, apparatus, and methods for incrementally restoring large disk arrays using logical volume manager (LVM) snapshots, i.e., background restore. More particularly, a background restore module can be invoked to manage the restore function from a secondary storage to a primary site. The primary site can have a newly installed storage devices (e.g., an array of disks). The background restore module can be configured to receive a request for a specific block, where the request can either be a write or a read request. The background restore module can then retrieve a restore block that surrounds the requested block from secondary storage, where the restore block is at a minimum as large as the typical granular block size of the disk drive. The size of the restore block can be a user-defined parameter. The retrieved restore block is then provided to the requester and written to the primary storage device. Simultaneously, a lower priority restore can be executing so as not to impact the throughput between the primary storage system and the secondary storage system. Unlike conventional restore functions, the background restore module can allow for conventional backup functions to continue while the background restore module executes.

In some embodiments, the background restore module can also be configured to restore the most frequently accessed blocks from the secondary storage system on a priority basis. More specifically, storage systems maintain access statistics for their respective disk drives. Accordingly, the access statistics can then be used to determine the most active blocks and then restore the most active blocks to the primary storage system on a prioritized schedule. In yet other embodiments, the background restore module can be configured to restore multiple snapshots from the secondary storage system, transferring not just the latest disk contents but also some amount of history of file modifications.

Figure 1:
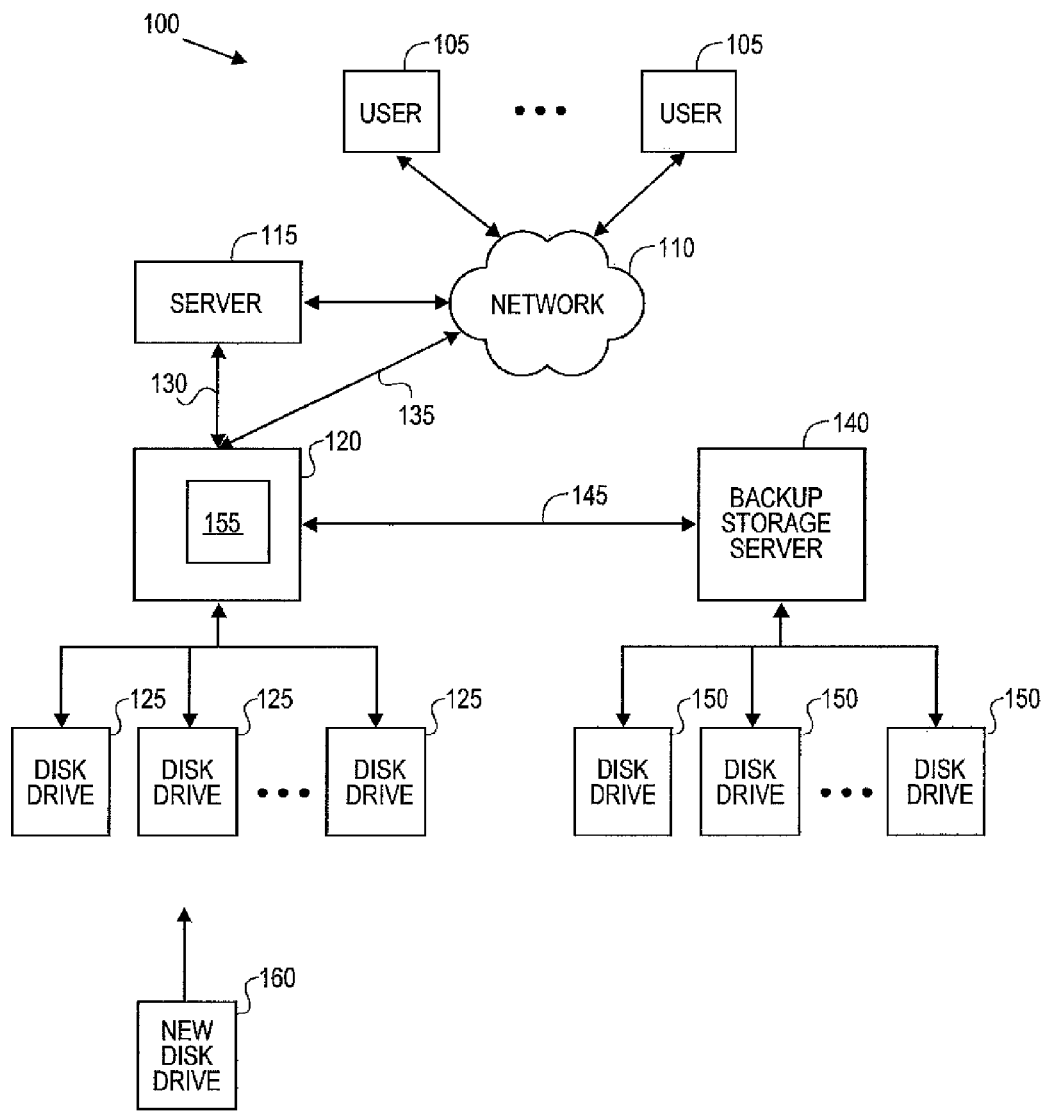
FIG. 1 depicts an exemplary system in accordance with various embodiments.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a plurality of users 105 connected by a network 110 to at least one server 115. The users 105 can be a user operating a workstation, client, a personal computer, laptop or other similar computing device. The users 105 can connect to the network 110 using a network interface such an Ethernet (wireless or wired) card using network protocols such as IEEE802.x. The network 110 can be a local area network, a wide area network or combinations thereof implementing network protocols such as TCP/IP, ATM, SONET, or other known network protocols.

The server 115 can be a single or multiple processor computing device executing a multi-user operating system such as Windows, UNIX (and it variations), Linux (and it variations), and other similar operating systems. Devices such as server 115 are well known and can be purchased from vendors such as Dell, Hewlett-Packard, Sun Microsystems or other vendors known to those skilled in the art.

The server 115 can be configured to provide application and data services to the users 105. The server 115 can host application for the users 105 to use and manipulate data. The server 115 can be configured to interface with the network 110 with a high-bandwidth network interface card conforming to applicable network standards.

The server 115 can also be configured with a primary storage system 120. The primary storage system 120 can be equipped with a disk controller coupled to multiple disk drives 125, which can be configured in redundant arrays (e.g., RAID 1-5) as deemed necessary by a system administrator and/or network requirements. The server 115 can be directly connected to the primary storage system 120 by a dedicated interface 130 such as IEEE1394, SCSI or other similar high-speed disk interface protocols. In some embodiments, primary storage system 120 can be coupled with the network 110 by a network connection 135. Thus, users 105 can directly access the primary storage system 120.

The primary storage system 120 can be further coupled to a secondary or backup storage system 140 through a dedicated backup interface 145. The backup connection 145 can be secondary network connection that is not coupled with network 110. This configuration provides a safety net in the event that network 110 fails and data can be saved and recovered without having network 110 being operational. The backup interface 145 can be typically a low-bandwidth connection since the primary role is to backup and restore data.

The secondary storage system 140 can be implemented with a disk controller (not shown) and a plurality of disks 150. The disks 150 can also be configured in a redundant array (e.g., RAID 1-5) to provide an additional level of backup as required by the system administrator. Accordingly, the secondary storage system 140 can receive data from the primary storage system 120 during backup operations and provide the backup data to the primary storage system 120 in the event of a failure of any of the disks 125.

In some embodiments, the primary storage system 120 can be configured to execute a background restore module 155. The background restore module 155 can be configured to detect when a new volume, i.e., a new disk 160, has been installed in the primary storage system 120 for a failed disk 125. The background restore module 155 can be configured to receive a request for a specific block in the new volume, where the request can either be a write or a read request. The background restore module 155 can then retrieve a restore block that surrounds the requested block from secondary storage system 140, where the restore block is at a minimum as large as the typical granular block size of the disk drive 150. The size of the restore block can be a user-defined parameter. The retrieved restore block is then provided to the requester and written to the disk drive 160 being restored in the primary storage system 120. Simultaneously, a lower priority restore can be executing so as not to impact the throughput between the primary storage system 120 and the secondary storage system 140. Unlike conventional restore functions, the background restore module 155 can allow for conventional backup functions to continue.

The background restore module 155 can also be configured to restore the most frequently accessed blocks from the secondary storage system 140 on a priority basis. More specifically, storage systems maintain access statistics for their respective disk drives. Accordingly, the access statistics can be used to determine the most active blocks and then restore the most active blocks to the primary storage system 120 from the secondary storage system 140. In other embodiments, the background restore module 155 can be configured to restore multiple snapshots from the secondary storage system, transferring not just the latest disk contents but also some amount of history of file modifications.

FIG. 2 depicts an exemplary block diagram of the background restore module 155 in accordance with another embodiment. It should be readily apparent to those of ordinary skill in the art that the block diagram depicted in FIG. 2 represents a generalized schematic illustration and that other components may be added or existing components may be removed or modified. Moreover, it should be readily obvious that the respective modules of the background restore module 155 can be implemented in software, hardware or combinations thereof.

As shown in FIG. 2, the background restore module 155 can comprise a control module 205 coupled to a disk interface ("I/F") 210 and an application program interface ("API") I/F 215. The control module 205 can be configured to provide the functionality of the background restore module 155 as described previously and in further detail below. The control module 205 can be implemented as a software module using a computer program language such as C, C++, PASCAL, Visual Basic, Java or other similar programming language. In other embodiments, the control module 205 can be implemented as a hardware device using EEPROM, application specific integrated circuits, PROM or other similar programmable devices. Various embodiments of the control embodiment can be a combination of hardware and software components.

The disk I/F 210 can be configured to couple with a storage system such as primary storage system 120. The disk I/F 210 can provide a communication channel for the control module 205 to issue commands to the storage systems. The API I/F 215 can be configured to receive and transmit commands and/or data between the users 105 (or operating system of the server 110) and the primary storage system 120.

FIG. 3 illustrates an exemplary flow diagram 300 executed by the background restore module 155 in accordance with yet another embodiment. It should be readily apparent to those of ordinary skill in the art that the flow diagram 300 depicted in FIG. 3 represents a generalized schematic illustration and that other steps may be added or existing steps may be removed or modified.

As shown in FIG. 3, the control module 205 of the background restore module 155 can be configured to detect the installation of a new volume (e.g., disk 160 in FIG. 1) in the primary storage system 120, in step 305. More particularly, with the detection of the newly mounted volume, the background restore module 155 can then begin monitoring/intercepting requests (write or read requests) for the newly mounted volume and retrieve the data from the secondary storage system 140.

In step 310, the background restore module 155 can be configured to execute a low priority restore command for the new volume. More specifically, the low priority restore operation rebuilds the newly mounted volume with the corresponding data from the secondary storage system 140 as with typical restore operation. However, the priority level of the restore is set low in order for the background restore module 155 to retrieve higher priority data from the secondary storage system 140.

In step 315, the background restore module 155 can be configured to receive a request (read or write) for data in the newly mounted data. The background restore module 155 can determine that the data is in the secondary storage system 140 and retrieve a restore block from the second storage system 140, in step 320. The restore block is a block of data that surrounds the requested block of data. In some embodiments, the restore block can be configured to be the typical granular block size of the disk drive 150. In other embodiments, the size of the restore block can be a user-defined parameter.

In step 325, the background restore module 155 can be configured to execute the request on the retrieved restore block of data. More specifically, if the request is a read request, the requested data is provided to the requester and the restore block is written into the corresponding location in the newly mounted volume. If the request is write request, the write command is written and then the newly modified data is written in the correspondingly location in the newly mounted volume.

Figure 4:
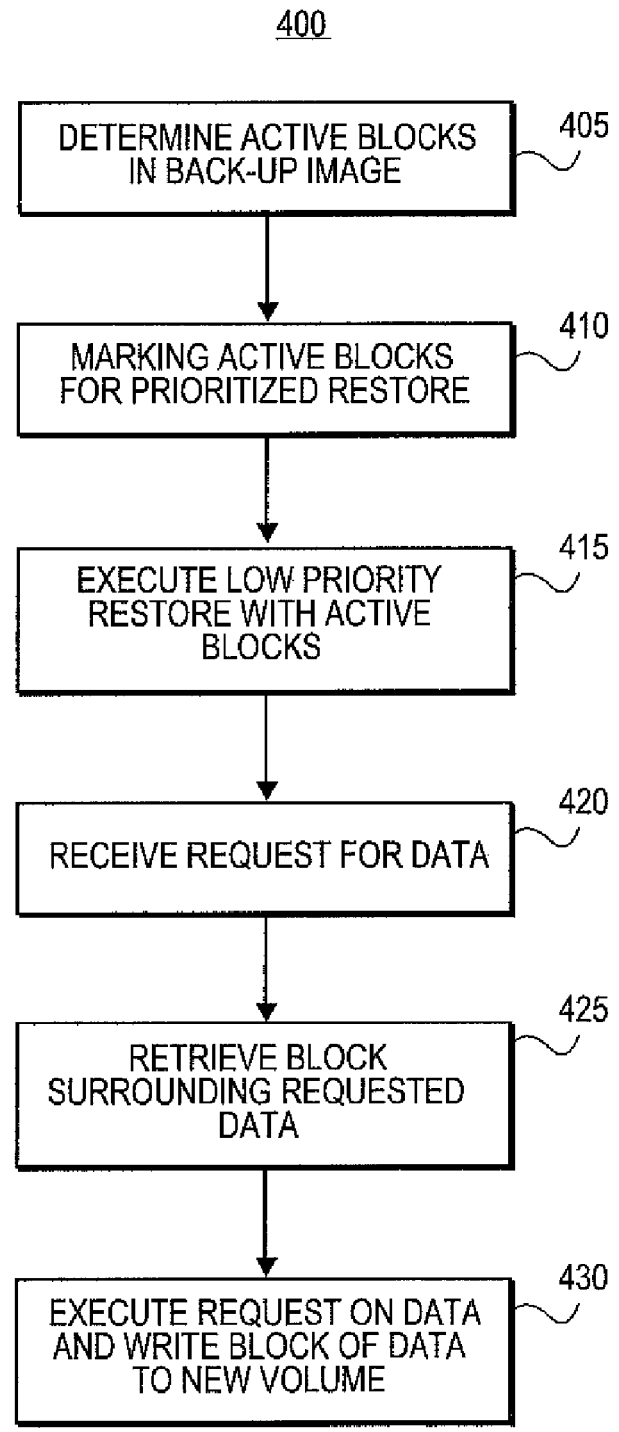
FIG. 4 illustrates another exemplary flow diagram executed by the tag control module in accordance with various embodiments.

FIG. 4 depicts an exemplary flow diagram 400 for the background restore module 155 in accordance with various embodiments. It should be readily apparent to those of ordinary skill in the art that the flow diagram 400 depicted in FIG. 4 represents a generalized schematic illustration and that other steps may be added or existing steps may be removed or modified.

As shown in FIG. 4, the control module 205 can be configured to determine the most active blocks for the back-up disk for a newly mounted volume, in step 405. More specifically, similar to step 305 of FIG. 3, the background restore module 155 can be configured to detect a new empty volume in the primary storage system 120. Subsequently, the background restore module 155 can determine the corresponding disk image in the secondary storage 140. The background restore module 155 can then determine the most active blocks in the image based on statistics kept in the metadata as known to those skilled in the art. The definition of most active block can be a user-defined parameter or characteristic.

In step 410, the background restore module 155 can be configured to mark the most active blocks for a prioritized restore. In step 415, the background restore module 155 executes a low priority restore of the active blocks that were marked. More particularly, the background restore module 155 can then restore the most active blocks on a higher priority level versus the rest of the less active blocks.

In step 420, the background restore module 155 can be configured to receive a request (read or write) for data in the newly mounted data. The background restore module 155 can determine that the data is in the secondary storage system 140 and retrieve a restore block from the second storage system 140, in step 425. The restore block is a block of data that surrounds the requested block of data. In some embodiments, the restore block can be configured to be the typical granular block size of the disk drive 150. In other embodiments, the size of the restore block can be a user-defined parameter.

In step 430, the background restore module 155 can be configured to execute the request on the retrieved restore block of data. More specifically, if the request is a read request, the requested data is provided to the requester and the restore block is written into the corresponding location in the newly mounted volume. If the request is write request, the write command is written and then the newly modified data is written in the correspondingly location in the newly mounted volume.

Figure 5:
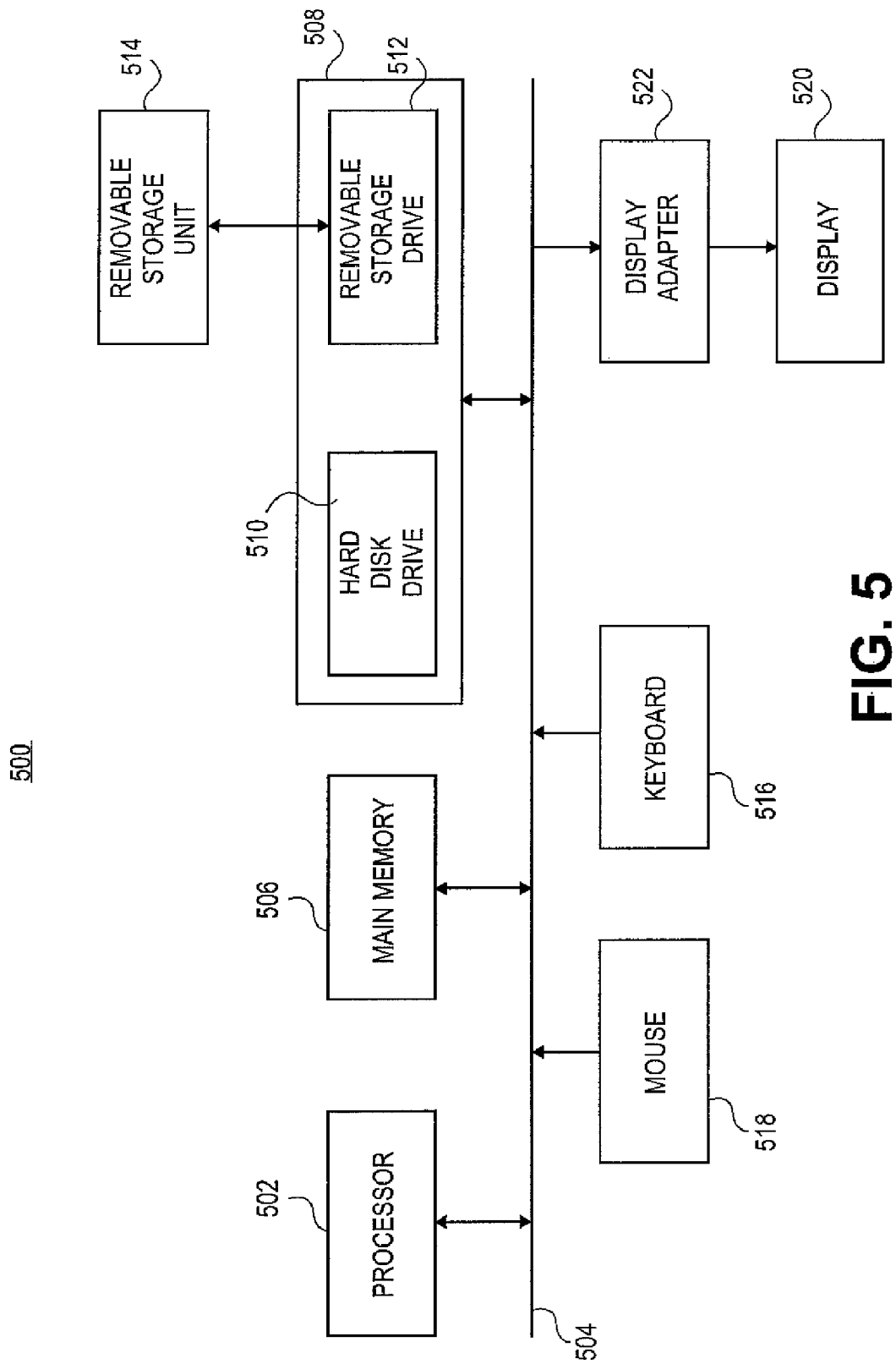
FIG. 5 depicts an exemplary computing platform in accordance with various embodiment.

FIG. 5 illustrates an exemplary block diagram of a computing platform 500 where an embodiment may be practiced. The functions of the background restore module 155 may be implemented in program code and executed by the computing platform 500. The background restore module 155 may be implemented in computer languages such as PASCAL, C, C++, JAVA, etc.

As shown in FIG. 5, the computer system 500 includes one or more processors, such as processor 502 that provide an execution platform for embodiments of the background restore module 155. Commands and data from the processor 502 are communicated over a communication bus 504. The computer system 500 also includes a main memory 506, such as a Random Access Memory (RAM), where the background restore module 155 may be executed during runtime, and a secondary memory 508. The secondary memory 508 includes, for example, a hard disk drive 510 and/or a removable storage drive 512, representing a floppy diskette drive, a magnetic tape drive, a compact disk drive, etc., where a copy of a computer program embodiment for the background restore module 155 may be stored. The removable storage drive 512 reads from and/or writes to a removable storage unit 514 in a well-known manner. A user interfaces with the background restore module 155 with a keyboard 516, a mouse 518, and a display 520. The display adapter 522 interfaces with the communication bus 504 and the display 520. The display adapter 522 also receives display data from the processor 502 and converts the display data into display commands for the display 520.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of restoring data in storage systems, the method comprising:
   mounting an empty volume in a primary storage system;
   determining a set of most active blocks that restore to the empty volume;
   restoring the set of most active blocks from a secondary storage system to the empty volume before restoring blocks that are not in the set of most active blocks;
   receiving a request for a selected block of data in the primary storage system;
   retrieving a restore block from the secondary storage system at a higher priority than the restoring, wherein the restore block encompasses the selected block of data; and
   writing the restore block to the empty volume in the primary storage system.

2. The method of claim 1, further comprising executing a backup process simultaneously with the restoring and retrieving.

3. The method of claim 1, wherein determining the set of most active blocks comprises:
   analyzing access statistics maintained by the primary storage system to identify at least one most active block.

4. The method of claim 1, wherein restoring comprises:
   copying current blocks from the secondary storage system to the empty volume; and
   copying a history of file modifications from the secondary storage system to the empty volume, wherein the history of file modifications relates to a file in the current blocks.

5. The method of claim 1, wherein restoring further comprises:
   marking the set of most active blocks for prioritized restoring.

6. The method of claim 5, wherein the set of most active blocks includes at least one active block that restores to the new volume.

7. A method of restoring data in storage systems, the method comprising:
   storing a current snapshot of a primary storage system in a secondary storage system, wherein the secondary storage system backs up the primary storage system;
   mounting an empty volume in the primary storage system;
   executing a restore process that transfers blocks from the current snapshot in the secondary storage system to the empty volume of the primary storage system, prioritized according to an access activity level associated with each of the blocks;
   receiving a request for a selected block of data in the primary storage system; and
   writing the selected block from the secondary storage system to the empty volume in the primary storage system at a higher priority than the restore process.

8. The method of claim 7, further comprising:
   selecting a past snapshot; and
   attaching a revision change containing information regarding a difference between the current snapshot and the past snapshot with the selected block.

9. The method of claim 7, wherein the writing further comprises:
   retrieving a restore block from the secondary storage system, wherein the restore block encompasses the selected block.

10. The method of claim 9, wherein the writing the selected block to the empty volume in the primary storage system further comprises:
    writing the restore block to the empty volume.

11. The method of claim 7, further comprising:
    determining at least one most active block in the secondary storage system; and
    marking the at least one most active block for prioritized restoration in the primary storage system.

12. The method of claim 11, wherein the at least one most active block is the at least one active block in a volume corresponding to the empty volume.

13. The method of claim 11, wherein the at least one most active block is the at least one active block in the current snapshot.

14. A system for restoring data, the system comprising:
    a primary storage system, wherein the primary storage system comprises at least one disk drive having a new volume and a storage server;
    a secondary storage system configured to provide a backup of data for the primary storage system, wherein the secondary storage system comprises at least a disk drive; and
    a background restore module configured to execute by the storage server, wherein the background restore module is configured to perform operations comprising:
    detecting the new volume;
    determining a set of most active blocks that restore to the new volume;
    restoring the set of most active blocks from the secondary storage system to the new volume before restoring blocks that are not in the set of most active blocks;
    receiving a request for a selected block of data in the new volume of the primary storage system;
    retrieving a restore block from the secondary storage system at a higher priority than the restoring, wherein the restore block encompasses the selected block of data; and
    writing the restore block to the new volume.

15. The system of claim 14, wherein the storage server is configured to execute a backup function simultaneously with the background restore module.

16. The system of claim 14, wherein determining the set of most active blocks comprises:
    analyzing access statistics maintained by the primary storage system to identify at least one active block.

17. The system of claim 14, wherein the background restore module is further configured to perform operations comprising:
    copying current blocks from the secondary storage system to the new volume; and
    copying a history of file modifications from the secondary storage system to the new volume, wherein the history of file modifications relates to a file in the current blocks.

18. The system of claim 14, wherein the background restore module is further configured to mark at least one block in the set of most active blocks for prioritized restoration in the primary storage system.

19. The system of claim 18, wherein the set of most active blocks includes at least one active block that restores to the new volume.

* * * * *